US006504867B1

(12) United States Patent
Efstathiou

(10) Patent No.: US 6,504,867 B1
(45) Date of Patent: Jan. 7, 2003

(54) DIGITAL MATCHED FILTERING FOR SIGNAL ESTIMATION IN A DIGITAL RECEIVER

(75) Inventor: Dimitrios Efstathiou, Greensboro, NC (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/277,263

(22) Filed: Mar. 26, 1999

Related U.S. Application Data
(60) Provisional application No. 60/079,481, filed on Mar. 26, 1998.

(51) Int. Cl.[7] .............................................. H04B 17/00
(52) U.S. Cl. ....................... 375/227; 375/343; 375/345; 375/329; 455/226.3
(58) Field of Search ................................ 375/224, 227, 375/329, 340, 345, 343; 455/226.3; 329/306

(56) References Cited

U.S. PATENT DOCUMENTS 5,940,451 A * 8/1999 Kim ........................... 375/345

OTHER PUBLICATIONS

Sami Hinedi, "NASA's next generation all–digital deep space network breadboard receiver", Jan. 1993, IEEE Transactions on Communications, vol. 41, No. 1.*
"The split symbol moments SNR Estimator in Narrow–band channels", by B. Shah, IEEE Transactions on Aerospace and Electronic Systems, vol. 26, No. 5, Sep. 1990, pp. 737–747.
"Universal carrier recovery loop for QASK and PSK signal sets", by A. Leclert, P. Vandamme, IEEE Transactions on Communications, vol. COM–31, No. 1, Jan. 1983, pp. 130–136.

"Comparison of Estimators for Frequency Offset", by J. Wolf, J. Schwartz, IEEE Transactions on Communications, vol. 38, No. 1, Jan. 1990, pp. 124–127.
"Comparison between digital recovery techniques in the presence of frequency shift", by F.Daffara, J. Lamour, 1994 International Communications Conference, pp. 940–945.
"Digital Demodulator Synchronisation: Acquisition Performance and Implementation Aspects", by G. Asceid, M. Moeneclaey, Proceedings of ICDSC 1992, Copenhagen, Denmark, pp. 255–262.
"A New Pattern Jitter Free Frequency Error Detector", by Thomas Alberty and Volker Hespelt, IEEE Transactions on Communications, vol. 37, No. 2, Feb. 1989, pp. 159–163.

* cited by examiner

Primary Examiner—Amanda T. Le
(74) Attorney, Agent, or Firm—Samuels, Gauthier & Stevens, LLP

(57) ABSTRACT

A digital radio tuner signal estimator receives a digitized in-phase (I) data signal and a digitized quadrature (Q) data signal and provides an estimated amplitude gain signal and an estimated signal-to-noise ratio signal value. The signal estimator includes a symmetrical matched I data digital filter having a first I filter section that filters the received I data signal and provides a first I data signal, and a second I filter section that filters the I data signal and provides a second I data signal. The signal estimator also includes a symmetrical matched Q data digital filter having a first Q filter section that filters the received Q data signal and provides a first Q data signal, and a second Q filter section that filters the Q data signal and provides a second Q data signal. The first and second I data signals and the first and second Q data signals are processed to compute an estimated amplitude gain. In addition, the first and second I data signals and the first and second Q data signals are processed to compute the estimated signal-to-noise ratio value. The present invention utilizes the symmetry of the FIR matched filter to facilitate providing signal estimation in a digital receiver.

10 Claims, 13 Drawing Sheets

DIGITAL MATCHED FILTERING FOR SIGNAL ESTIMATION IN A DIGITAL RECEIVER

CROSS REFERENCE TO RELATED APPLICATIONS

This application claims priority from the provisional application designated ser. no. 60/079,481 filed Mar. 26, 1998 and entitled "Combined Method and Structure for Digital Matched (Nyguist) Filtering $E_b/N_0$ Estimation, Digital Amplitude Gain Estimation and Carrier Frequency Offset Estimation at the Receiver in Digital Transmission". This application is hereby incorporated by reference.

BACKGROUND OF THE INVENTION

The invention relates to communications, and in particular to a digital radio tuner signal estimator.

Radio architecture has remained remarkably constant—for fifty years radios have been designed around the classic superheterodyne approach. For example, in conventional cellular basestations, each channel has a dedicated receiver tuned exclusively to that specific channel. Each of these receivers requires a fair degree of power, size and expense. This architecture leads to a lot of dedicated receivers in a basestation. Not only are these channels expensive, they are fixed/custom built for a given air interface/modulation standard (e.g., exclusively for AMPS), and tuned for a given channel setting.

However, developments in digital signal processing (DSP) and data conversion are providing radio receiver designers with the tools for more efficient architectures. For example, in the field of wireless base stations, wideband receivers have offered significant benefits, including reductions in base station cost, size, complexity, and power consumption of a basestation. In addition, wideband digital receivers can be rapidly configured to support a variety of air interface/modulation schemes and protocols (e.g., AMPS, NAMPS, TDMA, CDPD, etc.) simultaneously, and switching between them whenever required. Significantly, since the wideband digital receiver processing is performed in software (i.e., in a DSP), the receiver can easily be programmed to support new protocols as they are developed.

In a wideband receiver, the wideband signal is captured, bandshifted to an intermediate frequency (IF) and digitized using the single wide-band radio receiver, which provides a digitized IF signal. The digitized IF signal is then input to a plurality of digital tuners that each mix and filter the digitized IF signal to recover one of the individual channels associated with the tuner. For example, if there are 60 channels each 30 kHz wide, then the receiver must have a bandwidth of at least 3.6 MHz. Advantageously, the wideband receiver is shared between all the channels, instead of having a narrow band receiver dedicated to each channel. Of course, each channel still requires its own circuitry for the final processing, which is generally all digital.

In addition, the flexibility of the digital stage means that the basestation can be quickly "reprogrammed" to work with new standards. For example, some channels may operate with the conventional analog cellular standard (AMPS), while others use the newer digital IS-54 (TDMA) standard. Notably, because the decoding is performed by software, it can be changed "on the fly", so the mix of channels between standards can be changed as required. Indeed, even the channel becomes flexible—with complete freedom to change from 30 kHz of AMPS or TDMA, to 10 kHz for NAMPS or 1.25 MHz for CDMA. This can be done channel-by-channel as desired.

Since wideband receivers are preferably programmable, each channel digital tuner must accurately lock onto the frequency it is assigned to recover. In addition, estimation of various signal characteristics are often required.

Therefore, there is a need for a computationally efficient technique of signal estimation.

SUMMARY OF THE INVENTION

According to the present invention, a digital radio tuner signal estimator receives a digitized in-phase (I) data signal and a digitized quadrature (Q) data signal and provides an estimated amplitude gain signal and an estimated signal-to-noise ratio signal value. The signal estimator includes a symmetrical matched I data digital filter having a first I filter section that filters the received I data signal and provides a first I data signal, and a second I filter section that filters the I data signal and provides a second I data signal. The signal estimator also includes a symmetrical matched Q data digital filter having a first Q filter section that filters the received Q data signal and provides a first Q data signal, and a second Q filter section that filters the Q data signal and provides a second Q data signal. The first and second I data signals and the first and second Q data signals are processed to compute an estimated amplitude gain. In addition, the first and second I data signals and the first and second Q data signals are processed to compute the estimated signal-to-noise ratio value.

The symmetrical matched I data digital filter and the symmetrical matched Q data digital filter preferably comprise poly-phase filters. Other digital filter structures may also be used, including CSD structures.

The signal estimator multiplies the first and second I data signals, and integrates the resultant product to provide a first integrated value. The first and second Q data signals are also multiplied, and the resultant product is integrated to provide a second integrated value. The first and second integrated values are summed to provide a signal indicative of the estimated signal (without noise) noise.

To compute the estimated signal-to-noise ratio signal value, the signal estimator sums the first and second I data signals, computes the square of the resultant sum and provides a first squared signal indicative thereof. The first and second Q data signals are also summed and square of the sum is computed, and a second squared signal indicative thereof is provided. The first and second squared signals are summed and the sum is integrated to provide an integrated summed value, which is processed to provide a signal indicative of estimated signal and noise power. The signals indicative of estimated signal (without noise) power and estimated signal and noise power are processed to compute the estimated signal-to-noise ratio value.

The signal indicative of the estimated signal (without noise) noise is processed to provide the estimated amplitude gain.

The present invention utilizes the symmetry of the FIR matched filter to facilitate providing signal estimation in a digital receiver.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
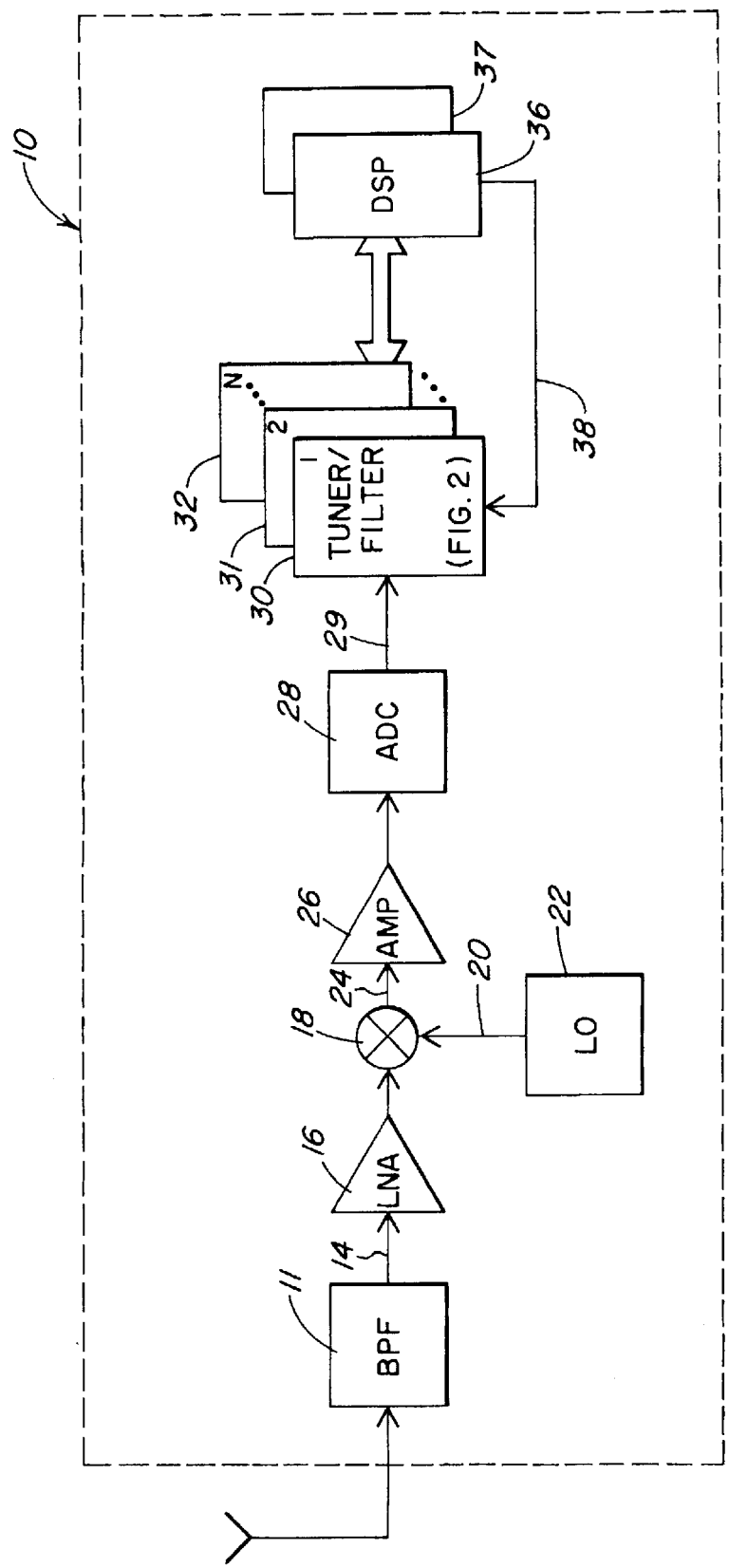
FIG. 1 is a block diagram illustration of a wideband digital radio receiver.

FIG. 1 is a block diagram illustration of a wideband digital radio receiver 10. The receiver includes bandpass filter (BPF) 11 that provides a bandpassed signal on a line 14 to a low noise amplifier (LNA) 16. The LNA 16 provides a signal to a mixer 18, which also receives a signal on a line 20 from a local oscillator (LO) 22 The mixer 18 provides a bandshifted signal on a line 24 at an IF frequency (e.g., 70 MHz) to a amplifier 26. Analog-to-digital converter (ADC) 28 provides a wideband digitized signal on a line 29 to a plurality of dynamic tuners 30–32.

Each tuner 30–32 may be set to recover a different carrier signal value from the wideband digitized signal on the line. For example, one or more digital signal processors (DSPs) 36, 37 may provide control signals on a line 38 that set-up the tuners to recover the desired modulated data signal. Significantly, this allows the receiver to be dynamically configured to support a number of the air interface/modulation techniques and protocols (e.g., AMPS, NAMPS, TDMA, CDPD, etc). . . An example of a suitable DSP is the model number ADSP-21-061 available from Analog Devices, Inc., the assignee of the present invention.

Figure 2:
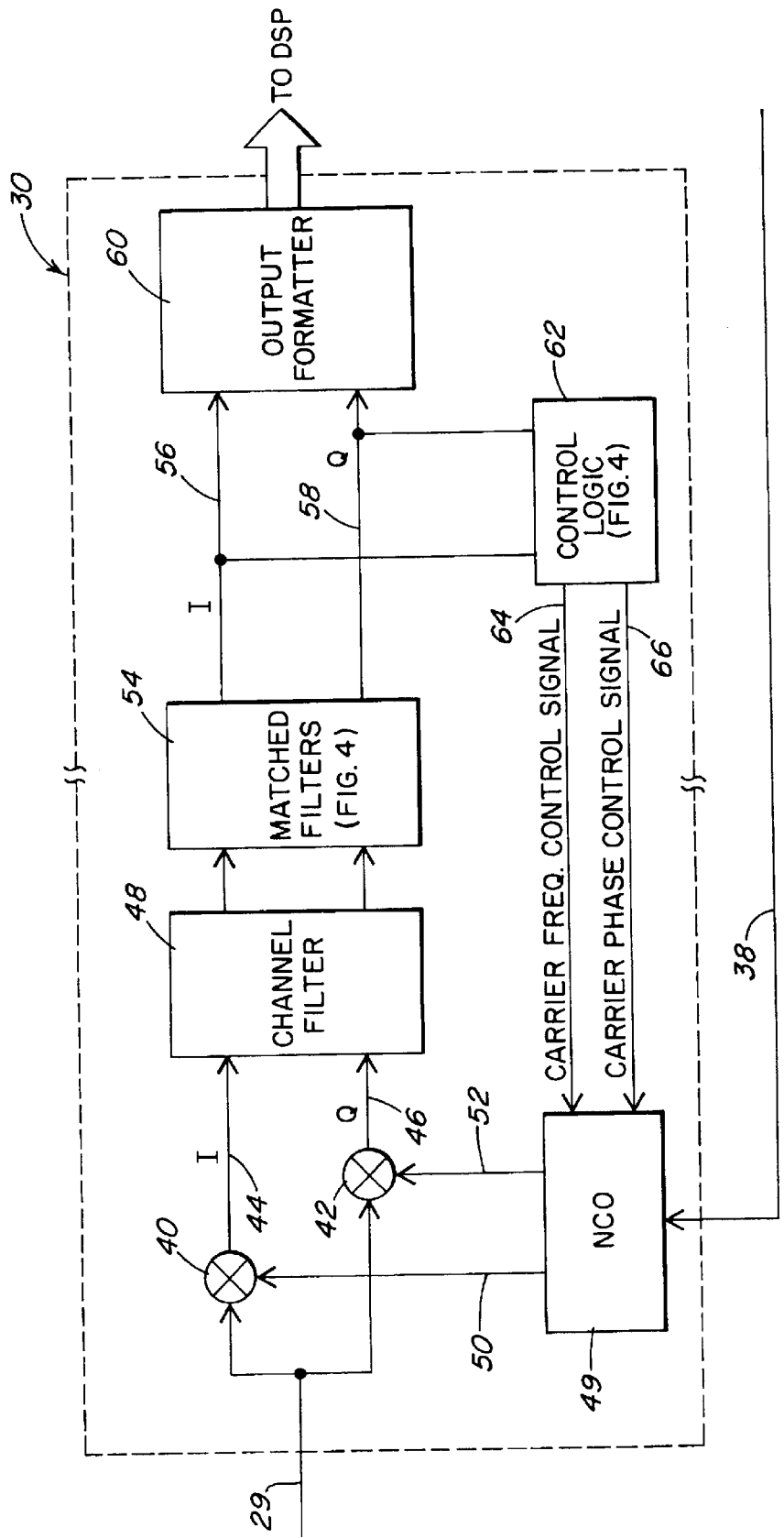
FIG. 2 is a block diagram illustration of a tuner of the digital radio receiver.

FIG. 2 is a block diagram illustration of the tuner 30 The signal on the line 29 is input to signal multipliers 40, 42 that provide in-phase (I) and quadrature (Q) signals on lines 44, 46, respectively, to channel filters 48. The signal multipliers 40, 42 also receive carrier recovery signals on lines 50, 52 generated by a numerically controlled oscillator (NCO) 49. The channel filter provides in-phase and quadrature signals to matched filters 54, which provide filtered signals on lines 56, 58 that are input to an output formatter 60 and control logic 62.

The control logic 62 processes the signals to provide a carrier frequency adjustment signal and a phase adjustment on lines 64, 66 respectively. These adjustment signals regulate the signals on the lines 50, 52 in order to more accurately lock the tuner 30 onto the desired carrier signal within the spectrum of the wideband digitized signal on the line 29. The control logic 62 and the NCO 49 provide a carrier recovery circuit, including a PLL.

In a preferred embodiment the control logic 62 is located within the tuner 30, which may be a dedicated integrated circuit (IC). However, in an alternative embodiment the function of the control logic 62 may be performed as a series of executable program steps within the DSP 36 (FIG. 1).

Figure 3:
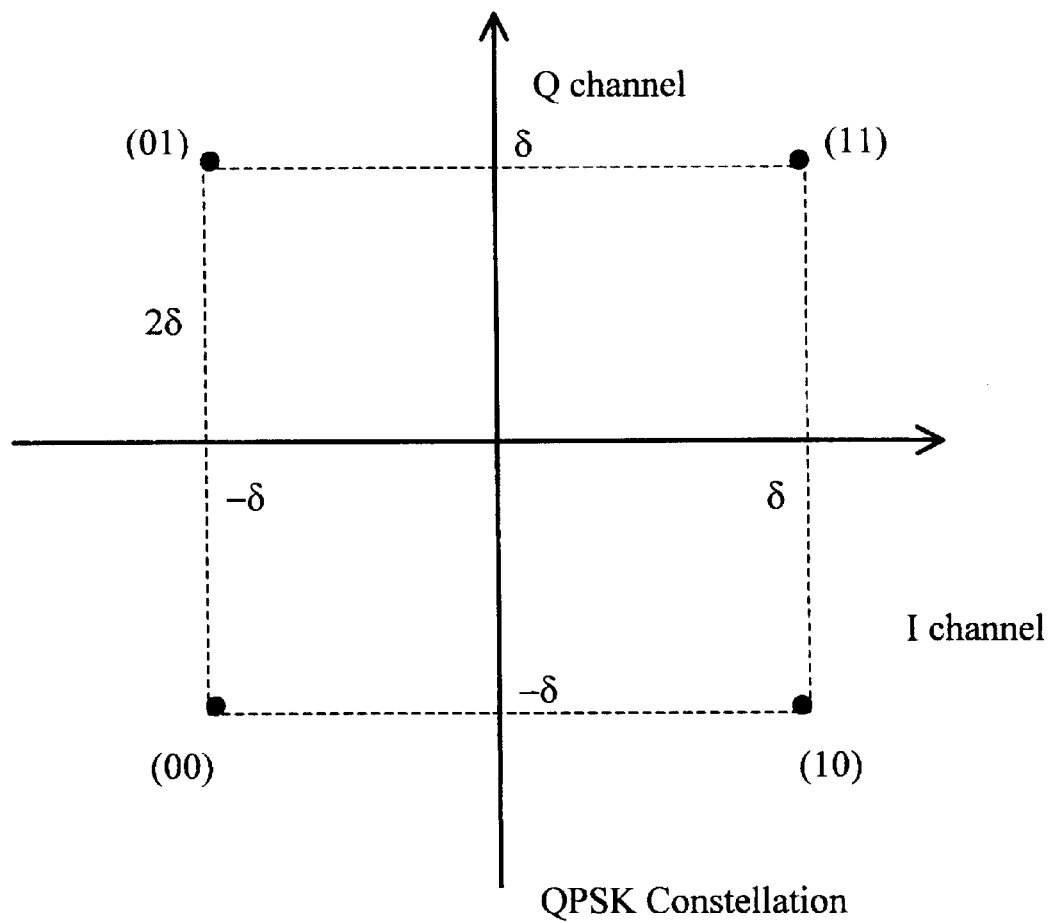
FIG. 3 is a graphical illustration of a QPSK modulation scheme for use in wireless communication systems.

In the following description, $r(r_I, r_Q)$ is the baseband received complex signal after analog-to-digital conversion and decimation. The following description assumes even number of samples-per-symbol at the input of the digital matched filters, and more specifically N=4 for illustrating the inventive techniques of the present invention. The invention can be applied to multi-phase and multi-amplitude digital modulation schemes (M-PSK, $\pi$/4-QPSK, M-QAM, M-PAM, with $M \geq 2$) which are used in most of the existing and emerging cellular and personal wireless communication systems. For the purpose of describing the present invention, a QPSK modulation scheme as shown in the graph of FIG. 3 shall be is considered for teaching the present invention. However, the present invention is clearly not limited to QPSK modulation. In the phase-amplitude plane, the QPSK signal points (or phasors) form a square with each pair of adjacent points separated by 28.

Figure 4:
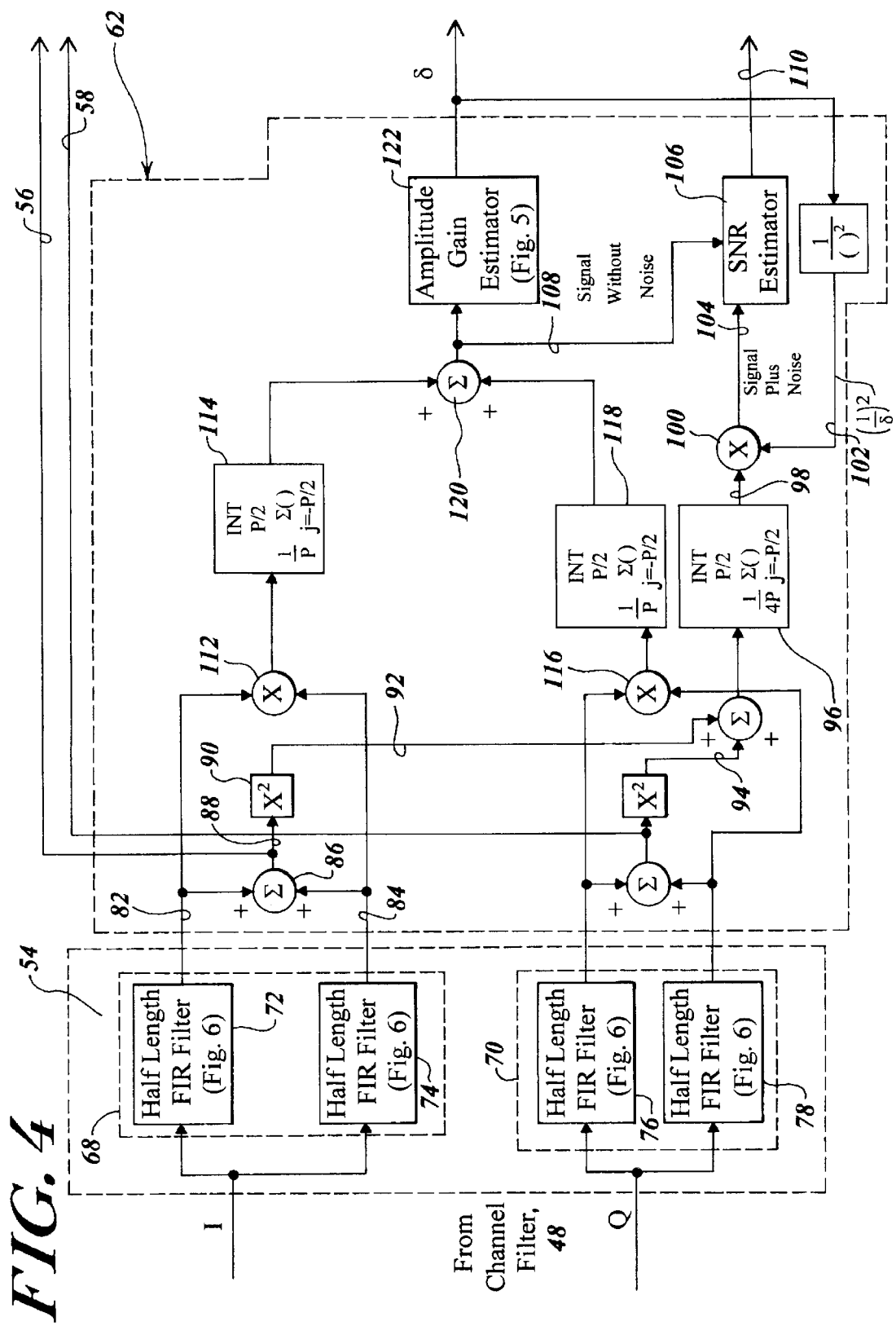
FIG. 4 is a block diagram illustration of matched filters and control logic within the tuner.

FIG. 4 is a block diagram illustration of the matched filters 54 and a portion of the control logic 62. As shown, the matched filters 54 include an inphase filter 68 and a quadrature filter 70. The inphase filter 68 includes a first one-half length FIR inphase filter 72 and a second one-half length FIR inphase filter 74. The quadrature filter 70 is also subdivided to provide a first one-half length FIR quadrature filter 76 and a second one-half length FIR quadrature filter 78. The filters are referred to as matched since the impulse response of the inphase filter 68 is identical to the impulse response of the quadrature filter 70. This is a significant advantage of the digital baseband filters compared to analog baseband filters, which generally suffer from channel mismatching. The impulse response of these filters at a receiver is the same to the impulse response of the pulse shaping filters at a transmitter, resulting in a minimal Inter-symbol Interference (ISI) at the receiver.

Notably, the impulse response of each inphase and quadrature filters 68, 70 can be split in two half length filters (L/2). For example, if the number of taps in the matched filters is eight (i.e., L=8), then taps 0, 2, 4 and 6 may be located in the first half length filter, while taps 1, 3, 5 and 7 are located in the second half length filter. The digital filter can be subdivided in this manner because of the distributive properties of multiplication and addition. As a result, the impulse response of the filter 72 is identical to the impulse response of the filter 76, and the impulse response of the filter 74 is identical to the filter 78.

Referring to the inphase channel, the filters provide signals on line 82, 84 that are input to a summer 86, which provides a summed signal on a line 88 to a square function 90. The square function computes the mathematical square of the signal on the line 88, and provides a squared signal value on a line 92. This signal is indicative of signal power. The Q-channel includes similar structure that provides a Q-channel power signal value on a line 94. The signals on the lines 92, 94 are summed and the resultant sum in input to an integrator 96, which provides a time integrated signal value on a line 98. This signal is input to multiplier 100 that also receives an estimated amplitude gain signal on a line 102, computes the product of the two signals, and provides a product signal value on a line 104 to a signal-to-noise ratio (SNR) estimator 106. The product signal on the line 104 is indicative of the power of the received signal plus noise. The SNR 106 also receives a signal on a line 108 indicative of the power of the received signal without noise. The difference of these two signals represents the noise power that is used with the signal on the line 108 to provide an estimated signal-to-noise ratio signal value on a line 110.

The digital radio tuner signal estimator also includes a first signal multiplier 112 that multiplies the inphase filtered signals on the lines 82, 84 and the resultant signal is input to an integrator 114. A second multiplier 116 receives the quadrature filtered signals from the one-half length FIR quadrature filters 76, 78. The resulting product is input to an integrator 118.

The values from the integrators 114, 118 are input to a summer 120 that provides a summed value on the line 108 indicative of signal power without noise. The integrators 114, 118 significantly reduce/remove the noise from the signal. The signal is input to an amplitude gain estimator 122.

Figure 5:
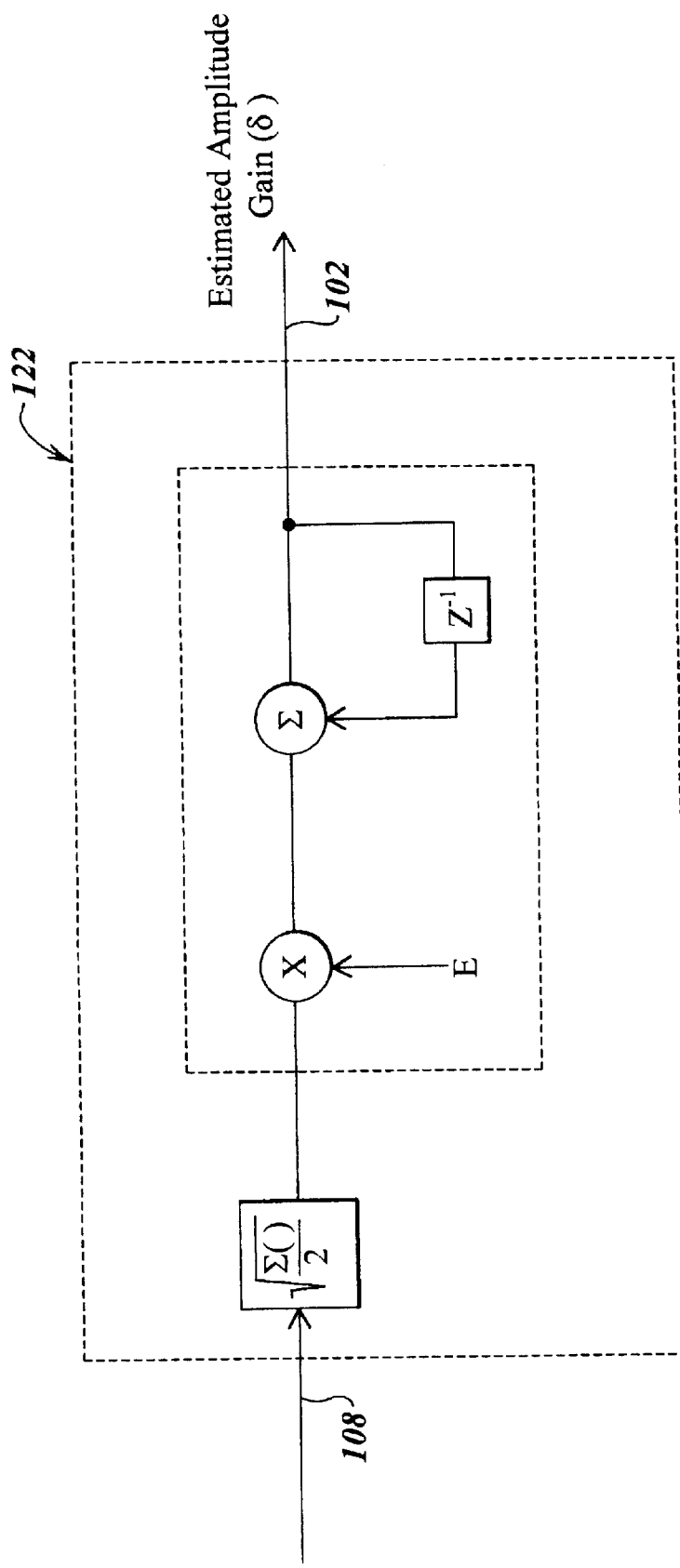
FIG. 5 is a block diagram illustration of the amplitude gain estimator.

FIG. 5 is a block diagram illustration of the amplitude gain estimator 122.

Figure 6A:
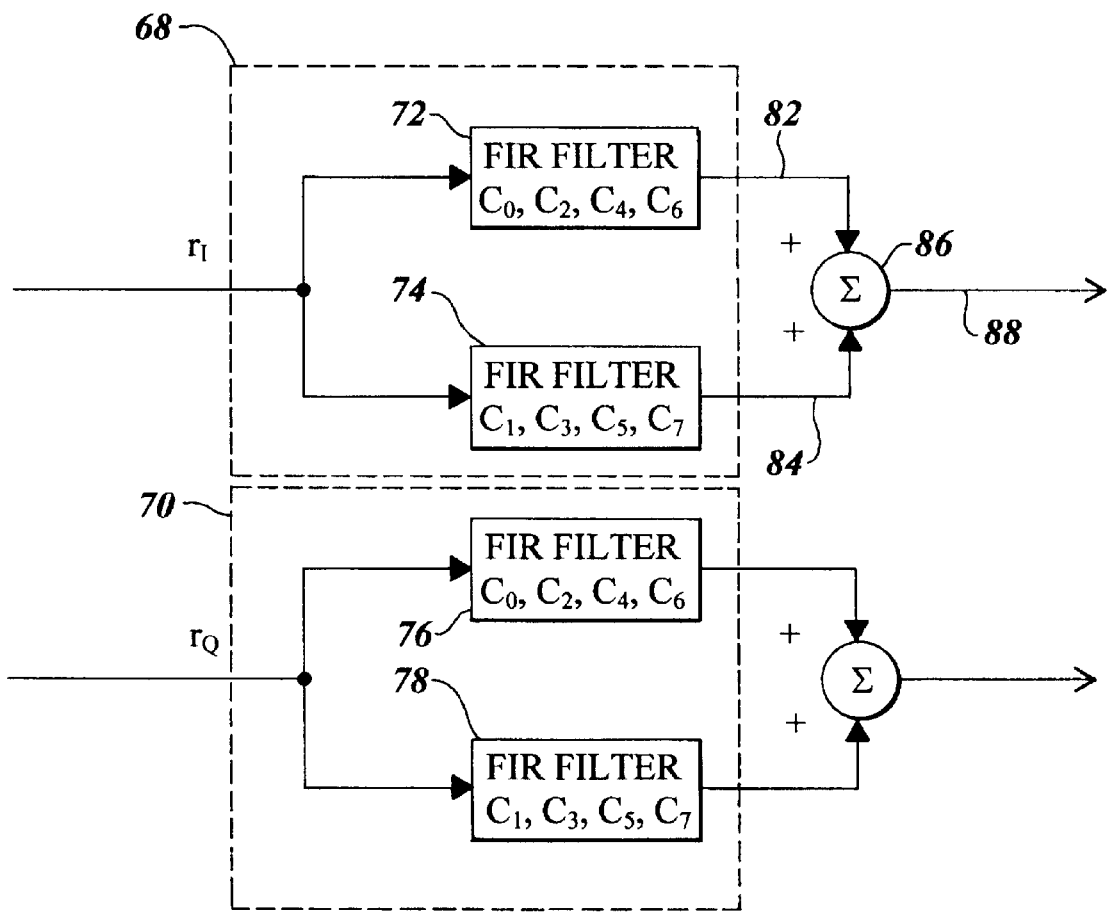
FIG. 6A is a block diagram of a digital matched filter in accordance with the invention.

FIG. 6A is a block diagram illustration of the matched filters including the inphase filter 68 and the quadrature filter 70. In one embodiment, the filters 68, 70 are eight tap FIR filters with weights $C_0$, $C_1$, $C_2$, $C_3$, $C_4$, $C_5$, $C_6$ and $C_7$. According to an aspect of the present invention, each of the filters 68, 70 is subdivided into half length filters. Specifically, inphase filter 68 is subdivided into the first one-half length FIR inphase filter 72 and the second one-half length FIR inphase filter 74. That is, these one-half length filters 72, 74 have four taps. The first one-half length FIR inphase filter 72 includes tap weights $C_0$, $C_2$, $C_4$ and $C_6$, while the second one-half length FIR inphase filter 74 includes tap weights $C_1$, $C_3$, $C_5$, and $C_7$. The outputs of the first and second one-half length filters 72, 74 are summed to provide the summed signal on the line 88, which is the same as if the input signal to the inphase filter 68 had been filtered by a single eight tap FIR filter with tap weights $C_0$, $C_1$, $C_2$, $C_3$, $C_4$, $C_5$, $C_6$ and $C_7$.

The quadrature filter 70 is subdivided into the first one-half length FIR quadrature filter 76 and the second one-half length FIR quadrature filter 78, each having four taps. The first one-half length FIR quadrature filter 76 includes tap weights $C_0$, $C_2$, $C_4$ and $C_6$ while the second one-half length FIR quadrature filter 78 includes tap weights $C_1$, $C_3$, $C_5$ and $C_7$. The outputs of these filters 76, 78 are also summed to provide a filtered signal mathematically the same as if the signal was filtered by a single eight tap FIR filter with tap weights $C_0$, $C_1$, $C_2$, $C_3$, $C_4$, $C_5$, $C_6$ and $C_7$.

Figure 6B:
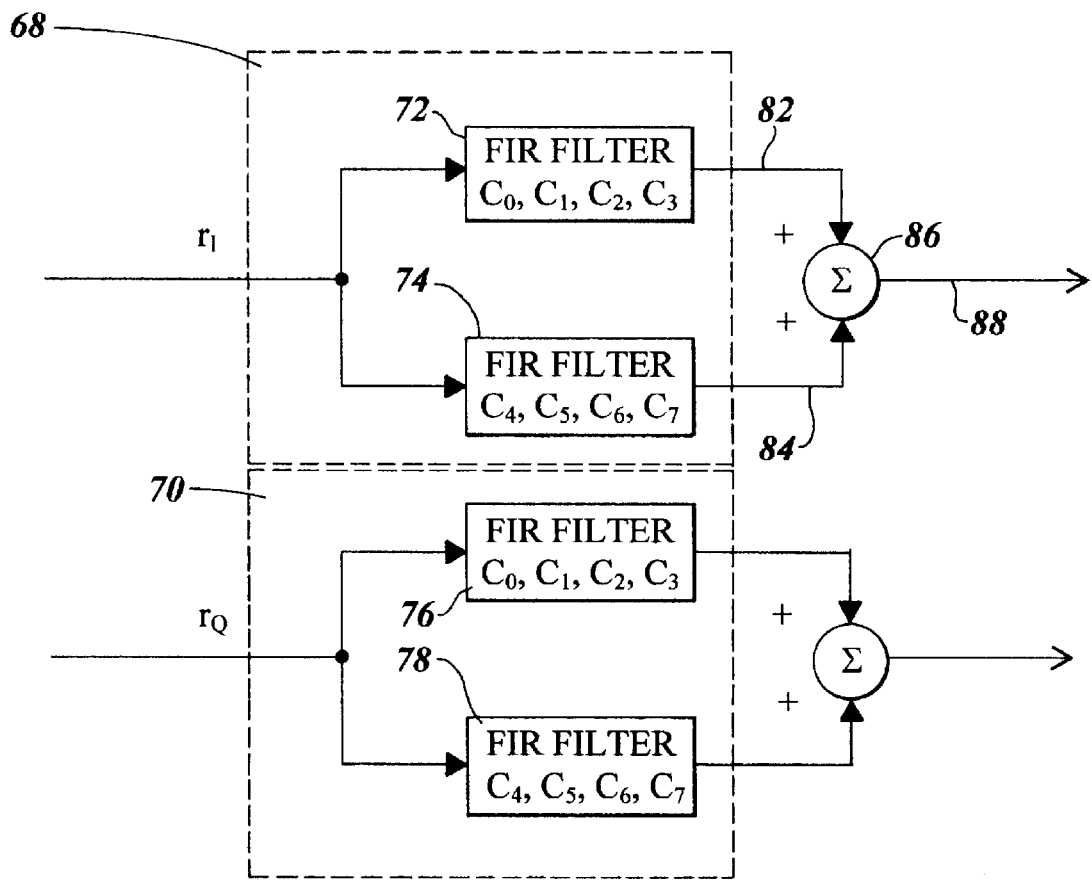
FIG. 6B is a block diagram of an alternative digital matched filter in accordance with the invention.

FIG. 6B is a block diagram illustration of another embodiment of the inphase filter 68 and the quadrature filter 70. Both filters 68, 70 are eight tap FIR filters with weights $C_0$, $C_1$, $C_2$, $C_3$, $C_4$, $C_5$, $C_6$ and $C_7$. In this embodiment the first one-half length FIR inphase filter 72 includes tap weights $C_0$, $C_1$, $C_2$ and $C_3$ while the second one-half length FIR inphase filter 74 includes tap weights $C_4$, $C_5$, $C_6$ and $C_7$. The first one-half length FIR quadrature filter 76 includes tap weights $C_0$, $C_1$, $C_2$ and $C_3$, while the second one-half length FIR quadrature filter 78 includes tap weights $C_4$, $C_5$, $C_6$ and $C_7$. One of ordinary skill will recognize that there are many permutations on how the tap weights can be subdivided to provide one-half length filters.

Figure 7A:
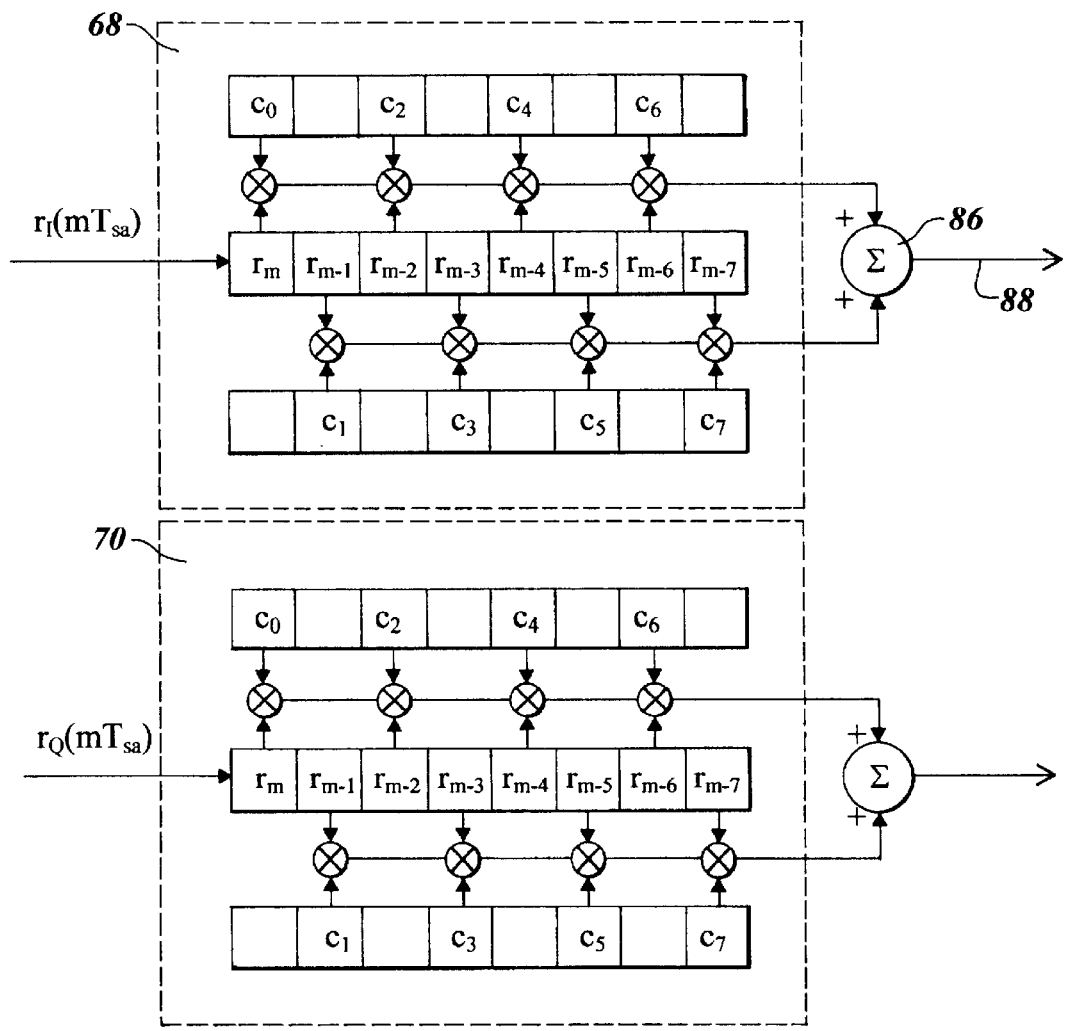
FIGS. 7A and 7B are more detailed illustrations of the matched filters illustrated in FIGS. 6A and 6B, respectively.
Figure 7B:
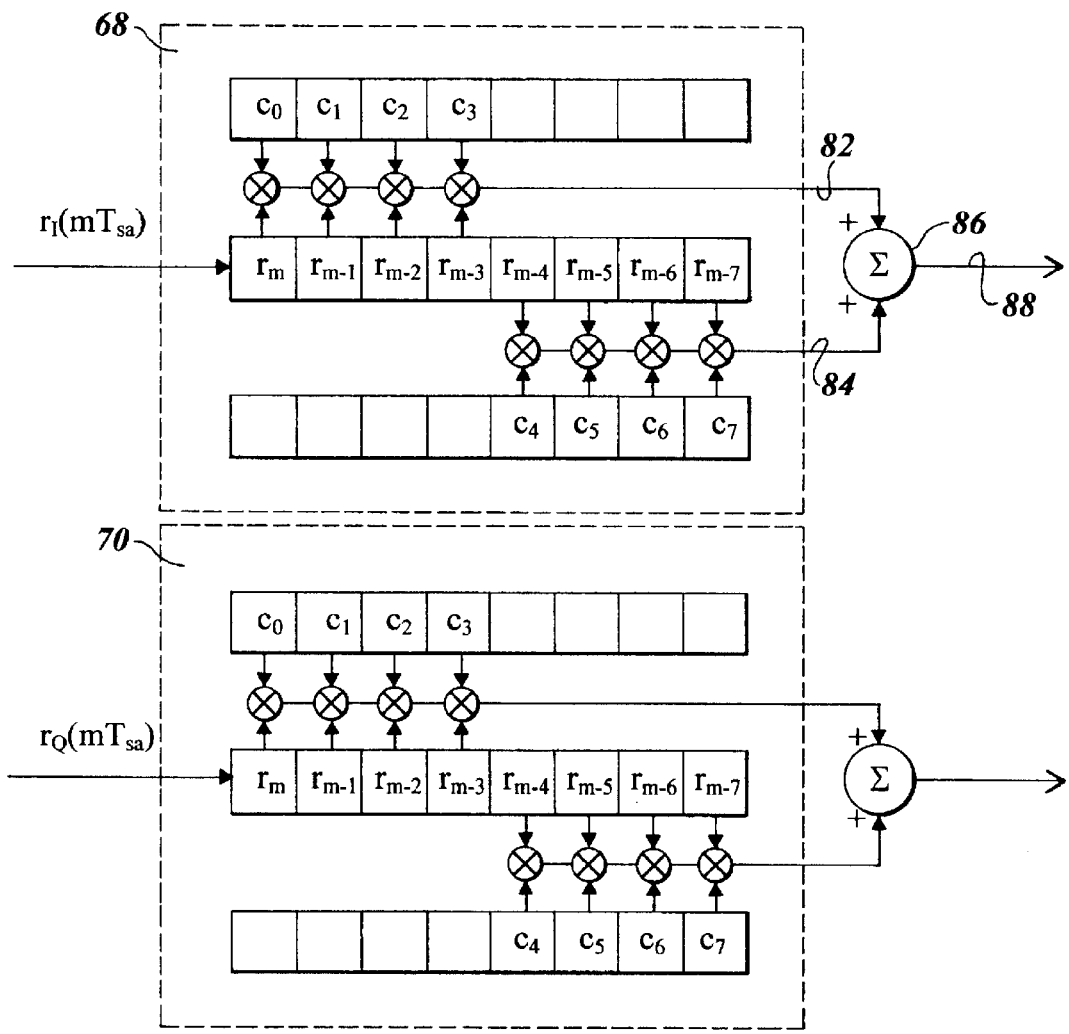

FIGS. 7A and 7B are more detailed illustrations of the matched filters illustrated in FIGS. 6A and 6B, respectively.

Referring again to FIG. 4, the SNR estimator. 106 operates as a monitor to assist in detecting problems or failures in the receiver system, and enhance PLL lock statistics performance of some critical units of base-band demodulators. The algorithm needs no known data or data decisions at the receiver. It is important to note, however, that the symbol timing recovery should be obtained before the SNR estimation.

The SNR estimator 106 operates at the data symbol rate, therefore it uses one sample every symbol. In order to optimize the performance of the SNR estimator 106, the optimum sampling instant is used (in both I and Q channels) where the inter-symbol interference (ISI) is minimal (the symbol timing should be obtained before the SNR estimation).

The output of the integrators 114, 118 may be expressed as:

$$S_{SI} = \frac{1}{P} \sum_{n=\frac{P}{2}}^{\frac{P}{2}} y_{evenI}(nTs) \cdot y_{oddI}(nTs)$$

$$S_{SQ} = \frac{1}{P} \sum_{n=\frac{P}{2}}^{\frac{P}{2}} y_{evenQ}(nTs) \cdot y_{oddQ}(nTs)$$

where the integration period or filter length is P symbols. These integrator 114, 118 output signals are summed with an adder 120 to provide the signal on the line 108, which is indicative of received signal power without noise.

The SNR estimator 106 also receives the (signal+noise) estimate signal on the line 104. The value is obtained by multiplying the signal on the line 98 by the average power correction factor $c_\beta = (1/\beta)^2$ on the line 102. The estimation of the received signal (signal+noise) power on the line 98 can be expressed as:

$$S_{(S+N)} = \sum_{k=\frac{P}{2}}^{\frac{P}{2}} (y_I^2(kTs) + y_Q^2(kTs))$$

Thus, the noise power will be $$S_N = S_{(S+N)} - S_S = \frac{S_S}{4} - \frac{1}{c_\delta^2}(S_{SI} + S_{SQ}),$$

which corresponds to the difference between the signal on the line 104 and the signal on the line 108. Then a good estimation of the signal-to-noise power ratio (SNR) can easily be calculated since we have an estimate of the signal and an estimate of the noise. The signal-to-noise power ratio (SNR) can be expressed as:

$$SNR = \frac{A^2}{2 \cdot \sigma^2} = \frac{S_{SI} + S_{SQ}}{2 \cdot \left(\frac{S_S}{4} - \frac{1}{\delta^2}(S_{SI} + S_{SQ})\right)}$$

where $A^2$ is the signal power in the absence of noise and $\sigma^2$ is the noise power present in the communication channel.

The amplitude gain estimator 122 can be considered as a combined product of the SNR estimator 106 described heretofore. Sampling occurs once every symbol at the optimum sampling instant (after symbol timing PLL has locked). The integrators 114, 118 remove the noise, where the integration period is P symbols. The sum of the integrators 114, 118 is input to the amplitude gain estimator 122, which provides an estimated amplitude gain that can be expressed as:

$$\hat{\delta} = \sqrt{\frac{S_{SI} + S_{SQ}}{2}}$$

The integrators 114 and 118 in each of the I and Q channels is shown as a block accumulator performing a simple averaging over P consecutive estimates. The data matched filter 54 assumes random data. However, if the determined filter length is not very long, this assumption may not be valid for the duration of the averaging. The amplitude gain estimate can vary depending on the actual symbol pattern during the averaging interval and the results can therefore be dependent on an adequate scrambling of the symbols. Transmitted data scrambling is a common operation in most of the existing standards (e.g., ciphering in GSM and long PN sequence $2^{14}$ in IS-95). If the scrambling is not sufficient, it may be necessary to increase the averaging filter length or use a more complex integrator.

Another aspect of the present invention is directed to frequency offset estimation. This aspect of the invention is based upon the general estimation technique disclosed by Alberty et al., "A New Pattern Jitter Free Frequency Error Detector", IEEE Transactions on Communications, Vol. 37, No. 2, February, 1989, pp. 159–163, which is incorporated herein by reference. Specifically, this aspect of the invention involves the combination of the implementation of a frequency recovery scheme with matched filtering and SNR estimation. The matched filter implementation described with reference to FIG. 6A is an optimal approach for integration of the frequency offset estimator to applications where the frequency offset is in the order of the transmission rate (i.e., $\Delta f = f_s$, where $f_s$ is the transmission rate).

Figure 8:
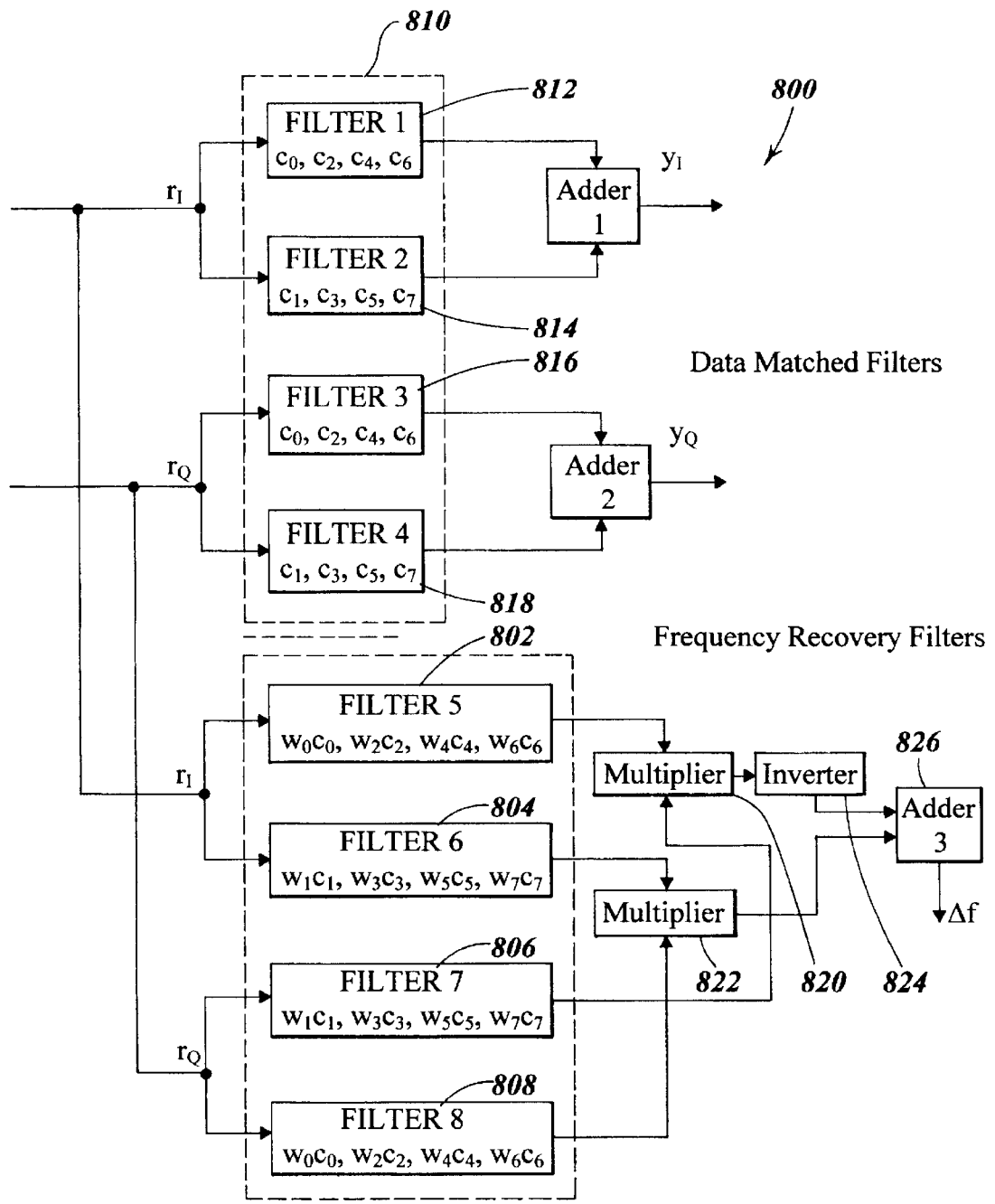
FIG. 8 is a block diagram of a frequency offset estimation unit and data matched filter unit in accordance with the invention.

FIG. 8 is a block diagram of a frequency offset estimator 800. The incoming base-band complex signal ($r_I$, $r_Q$) is fed to two pairs of base-band filters 802 and 804 for the I channel, and to filters 806 and 808 for the Q channel. FIG. 8 also shows a data matched filter 810 including I channel filter sections 812, 814 and Q channel filter sections 816, 818. The output of the I channel filter section 802 and the Q channel filter section 806 are multiplied by a multiplier 820, and the output of the I channel filter section 804 and Q channel filter section 808 are multiplied by a multiplier 822. The output of the multiplier 820 is sign inverted by an inverter 824, and subsequently added to the output of multiplier 822 by an adder 826. The output of the adder 826 is proportional to the frequency offset $\Delta f$.

The invention thus satisfies the conditions for pattern jitter-free frequency offset estimation. The filter sections 802, 804, 806, 808 of the I and Q channels are independently designed from the filter sections of the matched filter 810. The impulse response of the filter section 802 is equal to the impulse response of the filter section 806. Similarly, the impulse response of the filter section 804 is equal to the impulse response of the filter section 808.

An advantage of the invention is based on the combination of the data matched filter 810 and the frequency recovery filters. The concept is presented with reference to FIG. 9, which is a schematic diagram of a combined data matched filter and frequency recovery filter system 900. In the following description, an over-sampling of N=4 (4 samples per symbol) is assumed for the data matched filter impulse responses.

Figure 9:
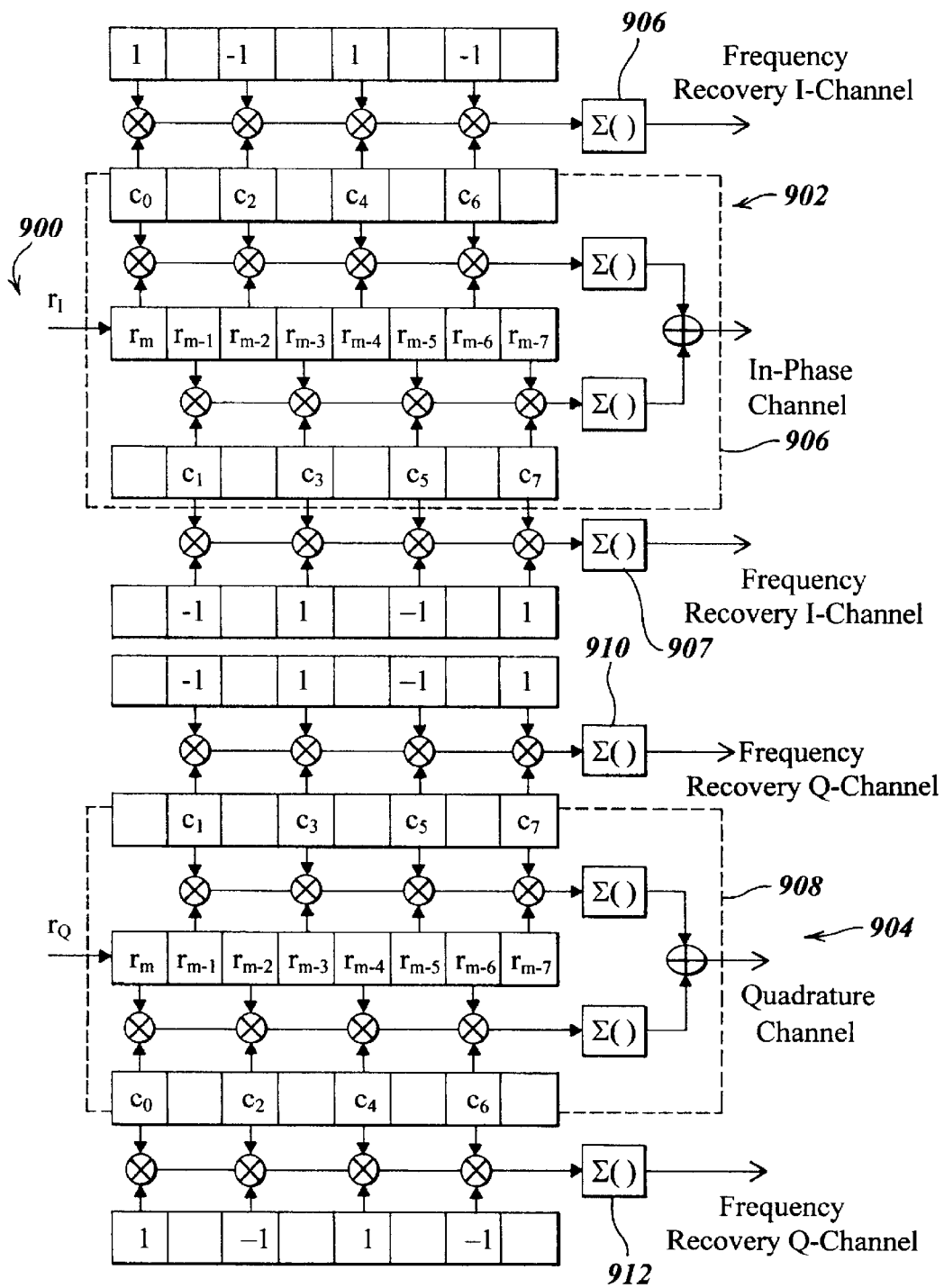
FIG. 9 is a schematic diagram of a combined data matched filter and frequency recovery filter system.

The frequency recovery filters (in this specific algorithm are dual frequency differential (DFD) filters) operate with the same weighted coefficients as the data filters. DFD filters 902 and 904 are obtained by multiplying weighted tap outputs by "1" (sign inversion), as appropriate. That is, the product from each tap is multiplied by either a "+1" or a "−1" and these products are summed by summers 906, 907 for the I channel, and summers 910, 912 in the Q channel. Accordingly, by adding a small piece of hardware which carries out the sign inversion to the output of each multiplication of a filter coefficient and a signal sample, the computational burden of data matched filter and dual frequency filters can be shared. Therefore, the specific frequency offset estimator can easily be combined with the matched filters structure as shown in FIG. 9.

Advantageously, this technique adds minimum complexity since the DFD filters can be implemented with simple adders and inverters. In the frequency offset estimator the weighting factors $w_i$ (as shown in FIG. 8) are defined as:

$$w_0 = 1 \qquad w_1 = -1$$
$$w_2 = -1 \qquad w_3 = 1$$
$$w_4 = 1 \qquad w_5 = -1$$
$$w_6 = 1 \qquad w_7 = 1$$

Figure 10:
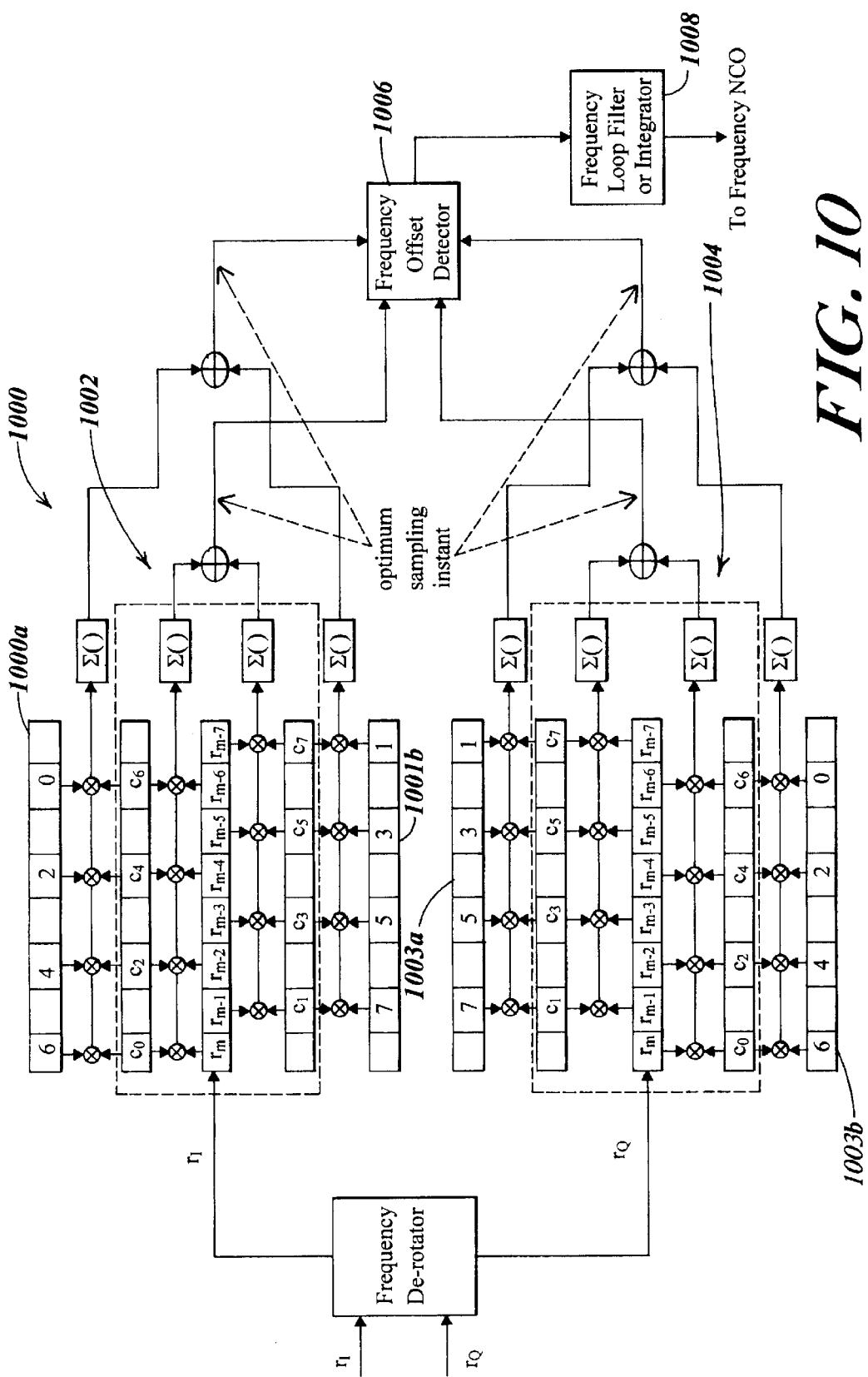
FIG. 10 is a schematic diagram of an alternative architecture for a combined frequency offset estimation unit and data matched filtering unit.

An alternative frequency recovery scheme is shown in FIG. 10, which illustrates a schematic of an alternative frequency offset estimator 1000. The algorithm utilized in this estimator 1000 is more complex than the previously described algorithm, and is fully described in Wolf et al., "*Comparison of Estimators For Frequency Offset*", IEEE Transactions on Communications, Vol. COM-38, pp. 124–127, January 1990, incorporated herein by reference. The implemented frequency offset recovery scheme uses one sample per symbol at the optimum sampling instant. The frequency offset estimator operates with a frequency offset detector 1006 and a frequency loop filter 1008 to combine the output of the combined data matched filter and the frequency recovery filter or frequency matched filters (1002, 1004). By adding a small piece of hardware or software (1001a–b, 1003a–b) which weights each tap output (i.e., the output of each multiplication of a data filter coefficient and a signal sample), the computational burden of the data matched filters and frequency matched filters can be shared.

This frequency offset recovery scheme can recover a frequency offset $\Delta f$ in the interval $[-f_s, f_s]$, where $f_s$ is the transmission symbol rate. The frequency matched filter has an impulse response that is the same as that of the data matched filter weighted by factors:

$$W_i = \begin{cases} L - 2m & i = 2(m-1) \\ & \qquad\qquad m = 1, \ldots L/2 \\ L - 2m + 1 & i = 2(m-1) + 1 \end{cases}$$

According to an aspect of the invention, the filter impulse response is L=8 samples, so the weighting factors are as follows:

$w_0 = 6 \quad w_1 = 7$ $w_2 = 4 \quad w_3 = 5$ $w_4 = 2 \quad w_5 = 3$ $w_6 = 0 \quad w_7 = 1$ The frequency offset recovery technique illustrated in FIG. 9 is better suited for a hardware implementation, and the technique disclosed in FIG. 10 is better suited for a software implementation.

Figure 11:
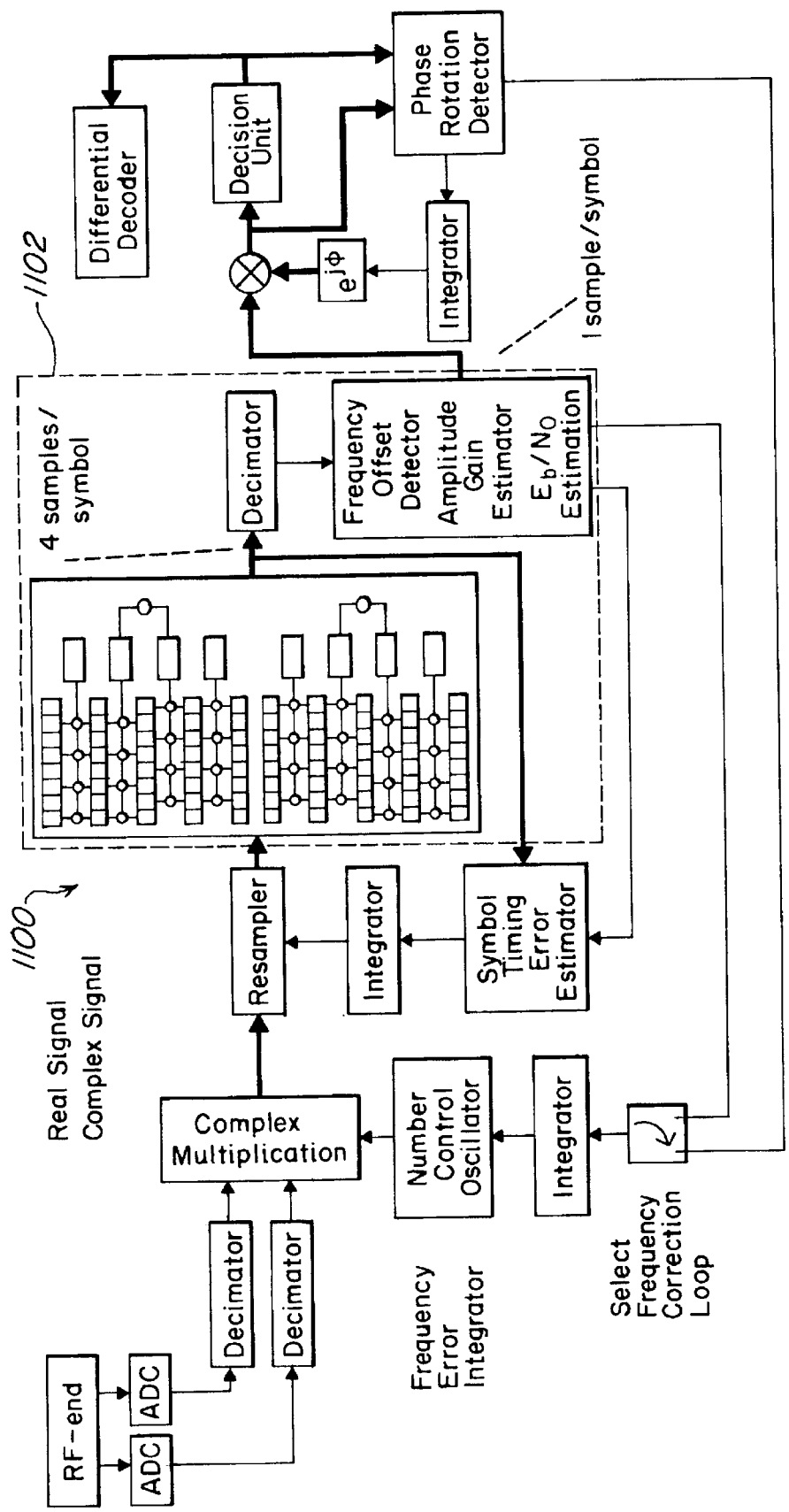
FIG. 11 is a block diagram of a base-band demodulator for use in a digital receiver system in which the demodulator includes a combined unit for data matched filtering, frequency offset detection, amplitude gain estimation and SNR estimation in accordance with the invention.

FIG. 11 is a block diagram of a base-band demodulator 1100 for use in a digital receiver system that includes a combined unit 1102 for data matched filtering, frequency offset detection, amplitude gain estimation and SNR estimation.

The invention may reduce the die area due to computational burden sharing (or combining) of four operations at the digital portion of a receiver, and as a result more cost efficient receivers (both hardware and/or software) can be implemented. The structure of the invention can be applied to any multi-phase and/or multi-amplitude modulation scheme (M-PSK, M-QAM, PAM), which are used for the majority of existing communication systems and should be a strong candidate for future communication systems.

As another benefit, a reliable $E_b/N_0$ estimation can enhance the receiver's performance. Most of the synchronization parameters estimation (carrier recovery, amplitude gain estimation, symbol timing recovery) statistics (mainly PLL lock statistics) can enhance their estimation or PLL lock performance through $E_b/N_0$ estimation.

The structure of the invention can be used in multi-rate transmission systems (e.g. Digital Video Broadcasting, DVB) in acquisition and/or tracking mode at the receiver.

The structure of the invention can result in a faster demodulator (for specific applications), therefore it provides flexibility for high data rate communication systems.

The invention has application both in wireless and wired digital communication systems. Specifically, the invention has application in personal satellite systems (e.g. Iridium, I-CO) where power budgets are marginal, in satellite TV (Digital Video Broadcasting (DVB), Digital Satellite System (DSS), and audio digital broadcasting (DAB). This invention could also be used in terrestrial radio and cable digital broadcasting systems in digital modems, in digital personal or cellular communication systems (e.g. UTRA, PHS, PDC, IS-136) and fits to some emerging technologies as Software Defined Radio transmitters and receivers. In general, the invention can be used in products that include base-band digital finite impulse response (FIR) filtering and demodulation process at the receiver (base stations or handsets). These products can include a wireless base station downconverter/channelizer, products that include digital phase locked loop (PLL) functions, digital modems, telephone handsets and software radio receivers.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A digital radio tuner signal estimator that receives a digitized in-phase (I) data signal and a digitized quadrature (Q) data signal and provides an estimated amplitude gain signal and an estimated signal-to-noise ratio value, comprising:

a matched I data digital filter having a first I filter section that filters said received I data signal and provides a first I data signal, and a second I filter section that filters said I data signal and provides a second I data signal;

a matched Q data digital filter having a first Q filter section that filters said received Q data signal and provides a first Q data signal, and a second Q filter section that filters said Q data signal and provides a second Q data signal;

means for computing an estimated amplitude gain, comprising
  i) means for multiplying said first and second I data signals, and for integrating the resultant product to provide a first integrated value;
  ii) means for multiplying said first and second Q data signals, and for integrating the resultant product to provide a second integrated value;
  iii) means responsive to said first and second integrated values for computing said estimated amplitude gain; and means responsive to said first and second integrated values, said first and second I data signals, and said first and second Q data signals, for computing said estimated signal-to-noise ratio value.

2. The digital radio tuner signal estimator of claim 1, wherein said matched I filter is symmetrical such that said first I filter section and said second I filter section include the same number of non-zero taps, and said matched Q filter is symmetrical such that said first Q filter section and said second Q filter section include an equal number of non-zero taps.

3. The digital radio tuner signal estimator of claim 2, wherein said means for computing an estimated signal-to-noise ratio value includes a summer that sums said first and second integrated values to provide a signal indicative of estimated signal (without noise) power.

4. The digital radio tuner signal estimator of claim 3, wherein said means for computing an estimated signal-to-noise ratio value comprises means for summing said first and second I data signals, for computing the square of the resultant sum, and for providing a first squared signal indicative thereof;

means for summing said first and second Q data signals, for computing the square of the resultant sum, and for providing a second squared signal indicative thereof;

means for summing said first and second squared signals, for integrating the sum to provide an integrated summed value, and for processing said integrated summed value to provide a signal indicative of estimated signal and noise power; and means responsive to said signal indicative of estimated signal power and said signal indicative of estimated signal and noise power, for computing said estimated signal-to-noise ratio value.

5. A digital radio tuner signal estimator that receives a digitized in-phase (1) data signal and a digitized quadrature (Q) data signal and provides an estimated amplitude gain signal value and an estimated signal-to-noise ratio signal value, comprising:

a symmetrical matched I data digital filter having a first I filter section that filters said received I data signal and provides a first I data signal, and a second I filter section that filters said I data signal and provides a second I data signal;

a symmetrical matched Q data digital filter having a first Q filter section that filters said received Q data signal and provides a first Q data signal, and a second Q filter section that filters said Q data signal and provides a second Q data signal;

means responsive to said first and second I data signals and said first and second Q data signals, for computing said estimated amplitude gain value; and means responsive to said first and second I data signals and said first and second Q data signals, for computing said estimated signal-to-noise ratio value.

6. The digital radio tuner signal estimator of claim 5, wherein said symmetrical matched I data digital filter comprises a first poly-phase filter, and said symmetrical matched Q data digital filter comprises a second poly-phase filter.

7. The digital radio tuner signal estimator of claim 6, wherein said means for computing an estimated amplitude gain comprises:

i) means for multiplying said first and second I data signals, and for integrating the resultant product to provide a first integrated value;

ii) means for multiplying said first and second Q data signals, and for integrating the resultant product to provide a second integrated value; and iii) means responsive to said first and second integrated values for computing said estimated amplitude gain.

8. The digital radio tuner signal estimator of claim 7, wherein said means for computing an estimated amplitude gain value includes a summer that sums said first and second integrated values to provide a signal indicative of estimated signal (without noise) power.

9. The digital radio tuner signal estimator of claim 8, wherein said means for computing said estimated signal-to-noise ratio value comprises means for summing said first and second I data signals, for computing the square of the resultant sum, and for providing a first squared signal indicative thereof;

means for summing said first and second Q data signals, for computing the square of the resultant sum, and for providing a second squared signal indicative thereof;

means for summing said first and second squared signals, for integrating the sum to provide an integrated summed value, and for processing said integrated summed value to provide a signal indicative of estimated signal and noise power; and means responsive to said signal indicative of estimated signal power and said signal indicative of estimated signal and noise power, for computing said estimated signal-to-noise ratio value.

10. The digital radio tuner signal estimator of claim 9, wherein said means for computing an estimated amplitude gain comprises means for multiplying said first and second I data signals, and for integrating the resultant product to provide a first integrated value;

means for multiplying said first and second Q data signals, and for integrating the resultant product to provide a second integrated value; and means responsive to said first and second integrated values for computing said estimated amplitude gain.

* * * * *